April 21, 1970     S. D. WILLS     3,507,303
LINEAR PRESSURE DIFFERENTIAL VALVE
Filed July 24, 1967     3 Sheets-Sheet 1

INVENTOR
SAUL D. WILLS
BY *Philip D. Amino*
ATTORNEY

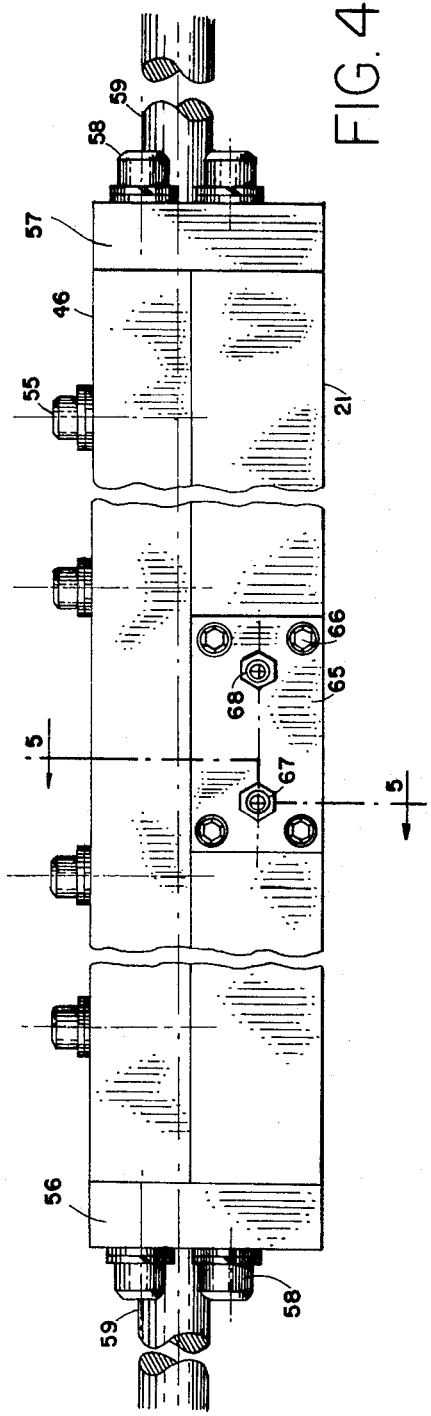
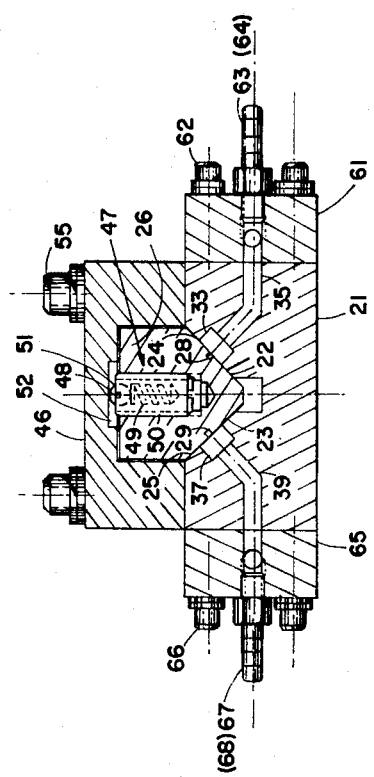

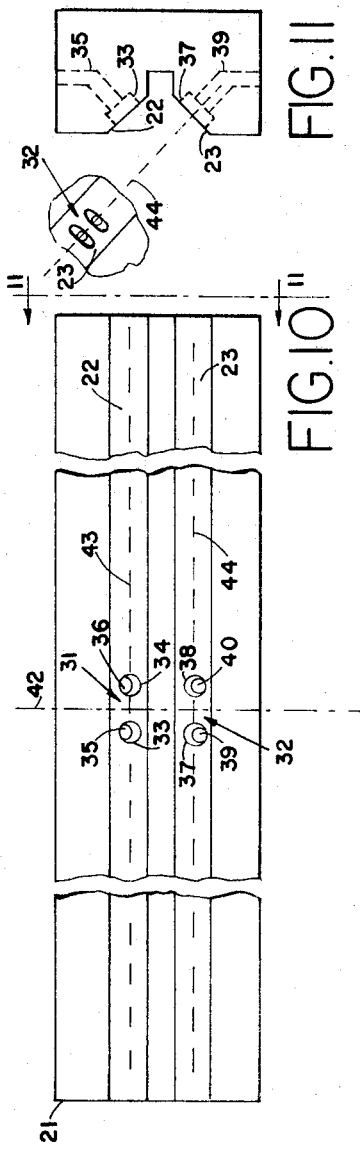

United States Patent Office 3,507,303
Patented Apr. 21, 1970

---

3,507,303
LINEAR PRESSURE DIFFERENTIAL VALVE
Saul D. Wills, Nashua, N.H., assignor to Sanders Associates, Inc., Nashua, N.H., a corporation of Delaware
Filed July 24, 1967, Ser. No. 655,466
Int. Cl. F16k 11/06
U.S. Cl. 137—625.48                              20 Claims

ABSTRACT OF THE DISCLOSURE

A linear pressure differential valve of the type having a pair of inversely variable fluid orifices which are varied together by an input actuation to provide at the output of the orifices an output differential pressure which varies linearly with the input actuation is improved to decrease overall deviation from linearity by providing a flow restrictor of predetermined impedance to the flow of operating fluid fed to the pair of inversely variable orifices.

---

This invention relates to linear fluid pressure differential valves of the type having a pair of inversely variable fluid orifices and more particularly to an improved valve of this type in which deviation from linearity is substantially improved.

Linear pressure differential valves sometimes called linear fluid potentiometers are employed for converting a mechanical input actuation into an equivalent fluid pressure differential. They require that the pressure differential shall vary linearly with the mechanical input. This requirement also occurs in many types of servo systems and position feedback systems.

The inversely variable orifice type fluid potentiometer provides a pressure differential output in response to a mechanical input actuation. In such a device, operating fluid at a given input pressure is fed simultaneously to both of the variable orifices which are varied simultaneously by the input actuation so that the pressure differential at the output of these orifices varies substantially linearly with the input actuation controlling the orifices. By and large, the variation is linear over only a small fraction of the maximum possible operating range of the valve. Beyond that fraction of the maximum range, the output pressure differential deviates substantially from linearity.

It is one object of the present invention to provide an improved linear fluid potentiometer.

It is another object of the present invention to extend the useful operating range of a linear fluid potentiometer in which the output pressure differential varies linearly with the mechanical input actuation.

It is another object of the present invention to extend the useful linear operating range of such a potentiometer to within at least sixty percent of the maximum possible operating range thereof.

A typical fluid potentiometer of the inversely variable orifice type, when fed operating fluid from an infinite source immediately adjacent the variable orifices will produce a pressure differential which varies quite linearly with changes in the area differential between the orifices. If this area differential is in turn varied linearly with a mechanical input actuation, then the output pressure differential will vary linearly with the mechanical input actuation. The range of acceptable linearity is generally no better than twenty to thirty percent of the maximum area differential that could be obtained with such a potentiometer and so the useful range of operation of the potentiometer is limited to twenty to thirty percent of the maximum physical range.

The present invention is based upon the discovery that by restricting fluid flow from the source to the variable orifices, the range of linearity can be extended and, in fact, the deviation from linearity can be tailored so that it will be of limited magnitude over part of the range where it can best be tolerated. For example, when the input impedance is equivalent to an orifice of area equal to twice the maximum differential area between the inversely varying orifices, the useful operating range is extended to sixty-five percent of maximum with less than one percent deviation from linearity thereover.

Other features and objects of the present invention will be apparent from the following specific description taken in conjunction with the figures in which;

FIGURES 4 and 5 are front and side sectional views of a typical linear fluid potentiometer;

FIGURES 6 and 7 are plan and side views of the slider in the potentiometer which has grooves defining the variable orifices;

FIGURES 8 and 9 are sectional views of the slider illustrating the grooves;

FIGURES 10 and 11 are plan and side views of the fluid potentiometer base showing fluid ports therein which cooperate with the grooves to form the variable orifices and;

FIGURE 12 is an enlarged view showing some of those fluid ports.

Figure 1:
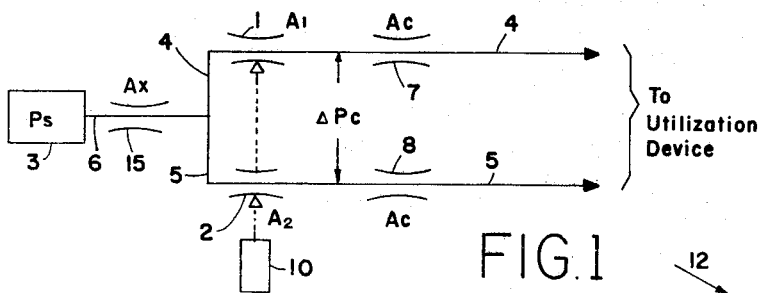
FIGURE 1 is a schematic diagram illustrating the principal parts of the invention.

The principal functioning parts of the present invention are illustrated diagrammatically in FIGURE 1. They include, a pair of inversely variable orifices 1 and 2 having areas denoted A1 and A2, respectively. These orifices are fed fluid, such as for example, hydraulic fluid from a source 3 at pressure $Ps$ so that the pressure immediately upstream of each of the orifices 1 and 2 is substantially the same. For this purpose, line 6 from the source connects to each of lines 4 and 5 containing the orifices 1 and 2. The output pressure differential between the outputs from the orifices is denoted $\Delta Pc$ and is simply the pressure differential just downstream of the orifices 1 and 2 in lines 4 and 5, respectively. The orifices are controlled simultaneously by the input actuator 10.

The fluid from the orifices 1 and 2 flowing in lines 4 and 5 is fed to a utilization device illustrated schematically as the orifices 7 and 8, which may be an output or feedback actuator in the hydraulic system or it may be a hydraulic amplifier or computer. The orifices 7 and 8 in each of the lines 4 and 5 represents substantially the impedance ordinarily existing between the variable orifices and the utilization device, as well as that of the utilization device, per se. It is preferred that these orifices 7 and 8 be the same (each of area Ac) so that the pressure differential presented to the utilization device is at least directly proportional to the pressure differential $\Delta Pc$ at the outputs of the variable orifices.

Figure 2:
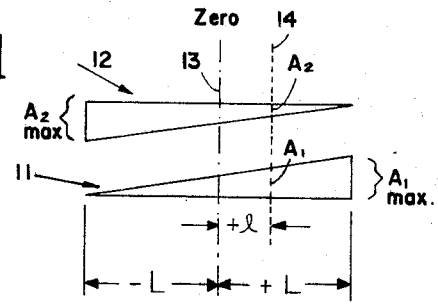
FIGURE 2 is a diagram to aid understanding operation of the inversely variable orifices.

Typical characteristics of a linear fluid potentiometer are shown in the diagram of FIGURE 2. In this diagram, the wedges 11 and 12 represent the relationship between the areas of the orifices 1 and 2, respectively, as functions of the input actuation from 10. The maximum mechanical actuation is denoted L and is plus or minus depending upon the direction of the input actuation to the right or to the left of the zero center position denoted by the center line 13. For example, when the mechanical input actuation from actuator 10 causes the variable orifices 1 and 2 to vary a distance denoted $l$ from their zero position, which their areas A1 and A2 are equal, and the input actuation is in the positive direction and of magnitude $l$, then the area of orifice 1 will increase by the same amount that the area of orifice 2 will decrease. These areas are represented by the portions of broken line 14 which crosses the wedges 11 and 12. Thus, it is seen the characteristics of the inversely varying orifices 1 and 2 are identical, but opposite, and the total area of the two orifices at any position of the mechanical input is the same. The following conditions describe the preferred relationships between the two variable orifices 1 and 2:

(1) when $l=0$, $A1=\frac{1}{2} A1$ max.$=\frac{1}{2} A2$ max.
(2) when $l=+L$, $A2=0$, $A1=A1$ max.
(3) when $l=-L$, $A1=0$, $A2=A2$ max.
(4) when $l=+l$,
$A1=\frac{1}{2} A1$ max. $(1+l/L)$
$A2=\frac{1}{2} A2$ max. $(1-l/L)$
(5) when $l=-l$,
$A1=\frac{1}{2} A1$ max. $(1-l/L)$
$A2=\frac{1}{2} A2$ max. $(1+l/L)$ The flow impedances (orifices) 7 and 8 in the lines 4 and 5 between the variable orifices 1 and 2 and the utilization device are preferably equal and it is preferred that they are equal to the variable orifices 1 and 2 at the zero position when the variable orifices are positioned as indicated by line 13 in FIGURE 2. Thus, if the impedances 7 and 8 are each equivalent to an orifice of area $Ac$, when it is preferred that $2Ac=A1$ max.$=A2$ max. When this occurs, then clearly, the total of the impedances 7 and 8 in the lines 4 and 5 is equal to the total of the impedances of the variable orifices 1 and 2 in these lines, because $A1+A2=2Ac$.

The linear fluid potentiometer described thus far with respect to FIGURES 1 and 2 exhibits useful linearity over approximately forty to fifty percent of the maximum range from 0 to $-L$ or $+L$. In accordance with the present invention, this range is substantially improved and/or increased by improving linearity so that a greater portion of the maximum range becomes useful. It has been found that an input flow restrictor 15 in the line 6 from the supply 3 to the two lines 4 and 5 of proper size, will improve and/or increase the linear range of the potentiometer. More particularly, if the impedance 15 is an orifice of area $Ax$ which is greater than $2Ac$, linearity and range can be improved. Some of these improvements to linearity are illustrated by the family of curves of various values of $Ax$ shown in FIGURE 3. These curves are plots of percent deviation from linearity versus $l/L$ for different values of $Ax$ in terms of $Ac$.

Figure 3:
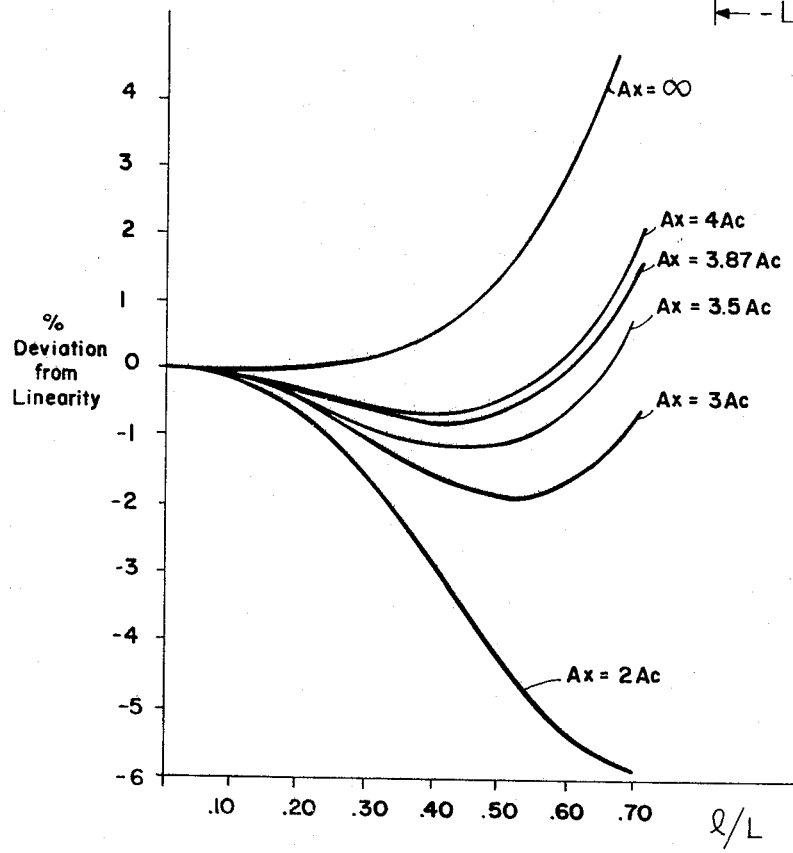
FIGURE 3 is a plot of percent deviation from linearity versus the ratio of mechanical input actuation to maximum mechanical input actuation and illustrates the improved effect of the input restrictor on linearity of operation over an extended range.

In FIGURE 3, the curve denoted $Ax=\infty$ represents one extreme of operation in which the source of input fluid at pressure $Ps$ is directly connected with the variable orifices 1 and 2, with no flow impedance therebetween. The other extreme is represented by the curve denoted $Ax=2Ac$, below which the impedance between the source 3 and variable orifices 1 and 2 is greater than the combined impedances of the orifices. Between these two extremes are a variety of curves where $Ax$ varies between $3Ac$ and $4Ac$ which exhibit good linearity varying no more than plus or minus two percent from perfect linearity all the way up to seventy percent of the maximum operating range of the potentiometer ($l/L=.70$). The best of these occurs in the range of $Ax=3.87Ac$ which yields linearity deviating less than one percent over sixty-five percent of the maximum range. Thus, as the permissible amount of deviation from linearity decreases, the greater is the improvement provided by the present invention; e.g., when the permissible deviation from linearity is only 0.5 percent, the maximum operating range of the potentiometer ($l/L$) is increased from approximately .375 to .60.

Detail structure of a linear fluid potentiometer which performs as shown in FIGURE 3 and functions as described in FIGURES 1 and 2 is described by FIGURES 4 to 12.

FIGURES 4 and 5 are plan and sectional side views of linear fluid potentiometer which includes an elongated base 21 having inclined faces 22 and 23 cut therein defining a groove running longitudinally from one end to the other of the base. The faces 22 and 23 define the same angle and accommodate the faces 24 and 25 of the slider 26 shown in FIGURES 6 and 7. The faces 24 and 25 of the slider have longitudinal tapered grooves 28 and 29, respectively, cut therein. The tapered groove 28 is shown in FIGURE 9 and the tapered groove 29 is shown in FIGURE 8.

The tapered grooves 28 and 29 slide in registry with the pairs of elongated fluid ports 31 and 32 in the faces 22 and 23 of the base. These ports in each pair are precisely parallel and sharp edged. The ports 33 and 34 which form the pair 31 connect with fluid passages 35 and 36 which open at the side of the base 21. Ports 37 and 38 form the pair 32 and connect with passages 39 and 40 which open at the opposite side of the base 21. Each of the ports in a pair are equally spaced on each side of the zero line 42 which is equivalent to the zero line 13 in FIGURE 2. The ports 33 and 37 are thus aligned on the same side of the zero line 42 and the ports 36 and 38 are aligned on the opposite side of the zero line 42.

The broken lines 43 and 44 running longitudinally along the faces 22 and 23 through the center of the ports represent the center line of the tapered grooves 28 and 29 showing how the center of the tapered groove crosses the centers of a pair of ports and the center of the corresponding fluid passages leading into the ports. This arrangement of the ports of pair 32 with relationship to the center line 44 is shown in FIGURE 11a and enlarged in FIGURE 12.

The linear fluid potentiometer is assembled with the slider 26 between the base 21 and the elongated cover 46 as shown in FIGURES 4 and 5. The slider 26 is urged against the base 21 so that the faces 24 and 25 are held firmly against the faces 22 and 23 by a spring loaded ball plunger 47 including a ball 48 and spring 49 in a sleeve 50 screwed into the slider 26. The ball is urged by the spring against a groove 51 in an accommodating channel 52 in the cover 46. This channel accommodates the portion of the slider 26 which projects above the base 21. Thus, the slider 26 is slideably held between the base and cover and the tapered grooves 28 and 29 in the slider are held flush against the pairs of ports 31 and 32, respectively.

The groove 28 provides a short passage between the ports 33 and 34 and the cross-section area of this passage is variable depending upon the position of the slider 26 along the base 21. The effect of this passage between the ports 33 and 34 is the same as an orifice of the same area and the area is determined by the depth of the portion of the tapered slot 28 which extends between the ports. Likewise, the tapered slot 29 provides a passage between ports 37 and 38 of pair 32 and the effective cross-section area of this passage is determined by the depth of slot 39. Quite clearly, as the slider 26 moves to the right relative to the base 21, the area of the passage between ports 37 and 38 decreases and the area of the passage between ports 33 and 34 increases. Furthermore, since the tapered slots 28 and 29 are identical, but tapered in opposite directions as shown in FIGURES 8 and 9, equal passages (orifices) will be provided when the slider 26 is centered in the base and the total flow cross-section area of these passages will be the same no matter where the slider is positioned in the base. Thus, the linear potentiometer described in these figures functions as described above with reference to FIGURE 2.

In FIGURES 4 and 5, the cover 46 and base 21 are assembled and fastened together with, for example, cap screws such as 55 and the ends caps 56 and 57 are fastened to the end of the assembly with cap screws 58.

These end caps seal the assembly and provide passage for the control rods 59 which extend from each side thereof and connect with an input actuator (not shown).

A fluid connection is made to the passages 35 and 36 opening from one face of the base, by a cover plate 61 fastened thereto by screws 62. This cover plate is equipped with fluid line connectors 63 and 64 which connect with the passages 35 and 36, respectively. Similarly, on the opposite side of the base, another cover plate 65 fastened by screws 66 provides connectors 67 and 68 which connect with the passages 39 and 40.

In operation, as shown in FIGURES 1 to 3, hydraulic fluid from a source 3 at pressure $Ps$ is fed by line 6 having an input restrictor 15 therein to each of the connectors 63 and 67 which represent the lines 4 and 5 shown in FIGURE 1. Thus, fluid from the input restrictor 15 flows into the passages 35 and 39 through the variable restrictors defined by the sections of tapered grooves 28 and 29 between the ports 33, 34, 37 and 38 and into passages 36 and 40 which connect with connectors 64 and 68, respectively. The differential pressure between fluid at couplers 64 and 68 is $\Delta Pc$ and these connect through equal impedances equivalent to orifices of area $Ac$ to a utilization device.

This completes description of the principal features of the present invention set forth in FIGURES 1 to 3 and the detailed construction of a particularly useful form of the invention set forth in FIGURES 5 to 12. The details are described by way of example and are not intended to limit the spirit and scope of the invention as set forth in the accompanying claims.

What is claimed is:

1. In a valve having a pair of inversely variable fluid orifices which are connected to a source of input fluid at a pressure $Ps$ through a line and which orifices provide an output fluid pressure differential $\Delta Pc$ which varies substantially linearly with mechanical input position $l$ throughout a limited range of values of $l$, means for increasing the range of values of $l$ throughout which $\Delta Pc$ varies substantially linearly with $l$ comprising, an input fluid flow restrictor having a cross sectional area less than that of said line and positioned in said line so as to be in the path of said input fluid at pressure $Ps$.

2. A valve as in claim 1 and in which, said flow restrictor is the equivalent of an orifice of area greater than the greatest difference in area between said inversely varying orifices.

3. A valve as in claim 1 and in which, said flow restrictor impedes the flow of said operating fluid less than the greatest impedance differential between said pair of inversely variable orifices.

4. A valve as in claim 1 and in which, said flow restrictor is the equivalent of an orifice of area about twice the greatest difference in area between said inversely varying orifices.

5. A valve as in claim 1 and in which, said flow restrictor is the equivalent of an orifice of area between one and a half and twice the greatest difference in area between inversely varying orifices.

6. A valve as in claim 1 and in which, each of said inversely variable orifices is followed by an output fluid flow restrictor, and the flow impedances of said output restrictors are substantially equal.

7. A valve as in claim 6 and in which, the flow impedance of each of said output restrictors is equal to less than one half the flow impedance of said input flow restrictor.

8. A valve as in claim 6 and in which, the flow impedance of each of said output restrictors is equal to about one half the maximum differential impedance between said inversely variable orifices.

9. A valve as in claim 6 and in which, the flow impedance of each of said output restrictors is equal to less than one half the flow impedance of said input flow restrictor and is equal to about one half the maximum differential impedance between said inversely variable orifices.

10. A valve as in claim 6 and in which, said input and output restrictors are orifices, said output orifices are of area $Ac$, said input orifice is of area between $3Ac$ and $4Ac$ and the maximum difference in area between said variable orifices is $2Ac$.

11. A linear pressure differential valve comprising in combination, first and second members having surfaces which slideably engage, a plurality of pairs of fluid ports in the said first member which emerge from said engaging surface thereof, at least two tapered grooves in said engaging surface of said second member, located so that a section of each groove forms a fluid passage between said fluid ports of a pair, a source of input fluid at pressure $Ps$, means for providing a fluid path from said source to one of said ports in each of said pairs, means for sliding one of said members along the other a variable distance $l$, and an input fluid flow restrictor in said fluid path which impedes fluid flow therein so that the differential pressure $\Delta Pc$ between the other ports of said pairs varies substantially linearly with $l$.

12. A valve as in claim 11 and in which, said sections of each groove which form fluid passages between the ports comprising a pair define first and second inversely varying orifices, and wherein said flow restrictor is the equivalent of an orifice of area greater than the greatest difference in area between said inversely varying orifices.

13. A valve as in claim 12 and in which, said flow restrictor impedes the flow of said operating fluid less than the greatest impedance differential between said pair of inversely variable orifices.

14. A valve as in claim 12 and in which, said flow restrictor is the equivalent of an orifice of area about twice the greatest difference in area between said inversely varying orifices.

15. A valve as in claim 12 and in which, said flow restrictor is the equivalent of an orifice of area between one and a half and twice the greatest difference in area between said inversely varying orifices.

16. A valve as in claim 12 and in which, each of said inversely variable orifices is followed by an output fluid flow restrictor, and the flow impedances of said output restrictors are substantially equal.

17. A valve as in claim 16 and in which, the flow impedance of each of said output restrictors is equal to less than one half the flow impedance of said input flow restrictor.

18. A valve as in claim 16 and in which, the flow impedance of each of said output restrictors is equal to about one half the maximum differential impedance between said inversely variable orifices.

19. A valve as in claim 16 and in which, the flow impedance of each of said output restrictors is equal to less than one half the flow impedance of said input flow restrictor and is equal to about one half the maximum differential impedance between said inversely variable orifices.

20. A valve as in claim 16 and in which, said input and output restrictors are orifices, said output orifices having an area $Ac$, said input orifice having an area between $3Ac$ and $4Ac$, and wherein the maximum difference in area between said variable orifices is 2Ac.

References Cited

UNITED STATES PATENTS

| | | | |
|---|---|---|---|
| 142,120 | 8/1873 | Richardson | 137—595 XR |
| 2,349,069 | 5/1944 | Ashton | 137—636 XR |
| 2,471,541 | 5/1949 | Plass | 137—101 XR |
| 2,496,577 | 2/1950 | Cahill | 137—115 |
| 2,597,177 | 5/1952 | Plass | 137—609 XR |
| 2,837,113 | 6/1958 | Thomas | 137—597 |
| 3,324,886 | 6/1967 | Way | 137—625.48 |
| 318,004 | 5/1885 | Laughlin | 137—610 XR |
| 388,748 | 8/1888 | Webb | 137—610 |

FOREIGN PATENTS

| | | |
|---|---|---|
| 143,725 | 3/1961 | U.S.S.R. |
| 941,632 | 4/1946 | France. |

M. CARY NELSON, Primary Examiner

R. J. MILLER, Assistant Examiner